(12) United States Patent
Ball et al.

(10) Patent No.: US 6,790,387 B1
(45) Date of Patent: Sep. 14, 2004

(54) PROCESS OF PRODUCING DIFFRACTION GRATINGS ON THE SURFACE OF ARTICLES

(75) Inventors: Melville Douglas Ball, Kingston (CA); Matthew James Fairlie, Shelbourne (CA); Harry Sang, Kingston (CA)

(73) Assignee: Alcan International Limited, Kingston (CA)

( * ) Notice: Subject to any disclaimer, the term of this patent is extended or adjusted under 35 U.S.C. 154(b) by 0 days.

(21) Appl. No.: 10/048,967

(22) PCT Filed: Aug. 9, 1999

(86) PCT No.: PCT/CA99/00728
§ 371 (c)(1),
(2), (4) Date: May 10, 2002

(87) PCT Pub. No.: WO01/11435
PCT Pub. Date: Feb. 15, 2001

Related U.S. Application Data

(63) Continuation-in-part of application No. 09/055,655, filed on Apr. 6, 1998, now abandoned.
(60) Provisional application No. 60/041,912, filed on Apr. 7, 1997.

(51) Int. Cl.[7] .............................. B29D 11/00; G02B 5/18
(52) U.S. Cl. ...................... 264/1.1; 264/1.31; 264/1.34; 29/17.8; 72/199; 72/365.2; 72/379.6
(58) Field of Search .................................. 264/1.1, 1.31, 264/1.34, 2.7; 359/1, 3; 29/17.8, 283.5; 72/253.1, 199, 274, 284, 287, 363, 325.2, 379.6; 428/687, 34.1, 342.2, 606

(56) References Cited

U.S. PATENT DOCUMENTS

| 3,731,600 A | 5/1973 | Earp | 93/58.1 |
|---|---|---|---|
| 4,012,843 A | * 3/1977 | Harada et al. | 33/19 A |
| 4,219,933 A | * 9/1980 | Kita et al. | 33/19 A |
| 4,547,141 A | 10/1985 | Ruschmann | 425/374 |
| 4,725,111 A | 2/1988 | Weitzen et al. | 350/3.85 |
| 4,725,511 A | 2/1988 | Reber | 428/620 |
| 4,773,718 A | 9/1988 | Weitzen et al. | 350/3.61 |
| 5,193,014 A | 3/1993 | Takenouchi et al. | 359/3 |
| 5,521,030 A | 5/1996 | McGrew | 430/1 |
| 5,786,910 A | * 7/1998 | Walters et al. | 359/2 |
| 5,810,957 A | * 9/1998 | Boswell | 156/220 |
| 5,881,444 A | 3/1999 | Schaefer et al. | 29/527.1 |
| 6,017,657 A | * 1/2000 | Mentz et al. | 430/1 |
| 6,361,702 B1 | * 3/2002 | Grear | 216/9 |
| 6,440,277 B1 | * 8/2002 | D'Amato | 204/192.15 |

FOREIGN PATENT DOCUMENTS

| EP | WO 01/11435 A1 | 2/2001 |
|---|---|---|
| GB | 260669 | 11/1926 |
| GB | 1 354 530 | 5/1974 |

OTHER PUBLICATIONS

Dolves and Hell article "Electron Beam Texturing of Rolls", Iron and Steel Engineer, Aug. 1991, pp. 34–38.

* cited by examiner

Primary Examiner—Michael La Villa

(57) ABSTRACT

A process of producing an article having a surface provided with an optical diffraction grating such that the surface generates visible color when illuminated with diffuse white light. The process involves deforming a starting material to produce the article having the surface and, during the deforming step, impressing a diffraction relief pattern on the surface by a tool provided with a bearing surface having a corresponding surface relief pattern of parallel lines that contacts the surface of the article under pressure. While the diffraction relief patter is being impressed, the surface is caused to slide in a direction of movement relative to the bearing surface of the tool. The invention also relates to the article.

15 Claims, 2 Drawing Sheets

PROCESS OF PRODUCING DIFFRACTION GRATINGS ON THE SURFACE OF ARTICLES

CROSS-REFERENCE TO RELATED APPLICATIONS

This application is a continuation-in-part of our prior application Ser. No. 09/055,655 filed Apr. 6, 1998, now abandoned.

This application is the national stage of International PCT Application PCT/CA99/00728 filed Aug. 9, 1999.

This application also claims the priority right of Provisional Patent Application Ser. No. 60/041,912 filed Apr. 7, 1997 by Applicants herein.

TECHNICAL FIELD

This invention relates to the formation of optical diffraction gratings (surface relief patterns) on the surfaces of sheets, foils and finished articles made of metals. The invention also relates to the articles exhibiting diffraction patterns thereby produced and to methods of making tools for impressing diffraction gratings onto surfaces of the articles. More particularly, although not exclusively, the invention relates to the patterning of sheets, foils and finished articles made of aluminum or aluminum alloys, such as beverage cans, foils, sheets, and the like, by imparting optical diffraction effects.

BACKGROUND ART

Aluminum and aluminum alloys are used nowadays for the formation of an ever increasing number of finished articles, including containers, foil packages and the like, intended for sale to the public at large either as finished products in themselves, or as part of the packaging of other items, such as foods and beverages. Articles of this kind are normally required to have a decorative finish, e.g. an applied coating, a paint layer, a transfer, a patterned transfer, or the like, in order to make such articles more attractive, more noticeable and therefore more saleable. Decorative finishes are an important marketing tool in an increasingly competitive market place.

As an example, it is to be noted that beverage cans made of aluminum are manufactured in large numbers and are usually decorated by the application of a paper label or, more commonly, by direct painting, lacquering or printing, or by the application of a decal. While such decorating methods make it easy to apply a wide range of patterns, messages and logos, etc., to the outer surface of the can body, they have the disadvantage that they make the recycling of used beverage cans somewhat more difficult (since the paper, paints, inks, etc., have to be removed in some way to avoid contamination of the recycled metal or interference with the remelting process) and, more importantly, they have the potential for causing pollution because they require the use of solvents or other harmful materials. As a result, expensive solvent recycling and scrubbing systems are required, or new technology making use of water-based inks, paints or lacquers, or the use of very small amounts of conventional solvents, must be developed.

It has long been known that very appealing decorative effects may be obtained by creating a diffraction grating on a surface of an article. A diffraction grating is a surface relief pattern formed by a series of ridges and/or grooves formed on or in the article surface, the ridges and/or grooves having spacings (i.e. distances separating one from another) in the order or the wavelength of visible light (about 1 micron). When illuminated with diffuse white light, diffraction gratings create light interference effects and produce visible coloured patterns with hues and intensities that often change with viewing angle (e.g. rainbow-like patterns). Such patterns are extremely attractive and eye-catching, and they may be created without having to apply any foreign substance onto the article surface.

One way of providing the outer surface of an article with a diffraction grating is to emboss the pattern of ridges or grooves directly onto the article surface by means of an impressing tool such as a die, roller, or the like, the tool itself having a bearing surface provided with a mirror image of the desired diffraction grating (i.e. projecting ridges where there are intended to be recessed grooves, or vice versa). Embossing techniques are effective for applying diffraction or holographic patterns to relatively soft materials, such as plastics (e.g. for applying security features to credit cards and bank cards). The patterns are typically applied using a nickel shim master, supported on a roll. The resulting embossed diffraction gratings may then be metallized (aluminized) by known methods to produce bright diffractive patterns or holograms.

However, it is not as easy to emboss diffraction gratings directly onto articles having harder surfaces, e.g. metal surfaces, particularly when subsequent metal treating operations are required. As an example, the formation of aluminum beverage cans is considered. The cans are first formed by drawing a metal cup from sheet metal and then lengthening the sides of the cup by passing the cup through two or three successively smaller ironing rings. A lid is then applied to the can body to close the container. If a diffraction grating were to be embossed on the surface of the stock sheet metal, it would be eliminated by the surface smoothing action of the drawing and ironing stages. On the other hand, if the finished can were embossed with the diffraction pattern, this would require high embossing pressures because the drawing and ironing steps make the metal "hard" and it would be difficult as a result to avoid distorting the cans, even if they were well supported. A proposed method of carrying out such an embossing procedure on a can body is described in U.S. Pat. No. 5,881,444 which issued on Mar. 16, 1999 to Aluminum Company of America, in which the can is supported by a mandrel and pressed against a hardened embossed tool. It is noted that the process requires sufficient pressure to cause transfer of the embossed pattern to the can surface, while the pressure should not be so high that the wall of the can is distorted or deformed. In the experience of the inventors of the present invention, these two requirements cannot be satisfied satisfactorily at the same time, and an efficient pattern transfer is generally accompanied by an unacceptable distortion of the metal substrate. Similarly, if the pressure is reduced to avoid distortion, poor pattern transfer occurs. Moreover, the embossing step would have to be carried out very quickly in order not to delay the production rate of the cans (a typical line speed for can production is about 300 cans per minute). These factors make the embossing procedure unattractive for can bodies.

On the other hand, if the metal is soft enough to make the application of a diffraction pattern relatively easy (e.g. if the metal is in the form of a thin foil), the pattern may be distorted during the impressing step because the thickness reduction that will occur will be accompanied by an elongation or spread of the substrate metal.

U.S. Pat. No. 4,725,111 to Weitzen et. al., which issued on Feb. 16, 1988 to American Bank Note Holographics, (and corresponding divisional U.S. Pat. No. 4,773,718 which issued on Sep. 27, 1988) discloses a process of the above-mentioned type of applying diffraction patterns and holograms directly onto surfaces of metal materials, such as household aluminum foil and beverage cans. This is achieved by passing a metal foil or plate between a heated contoured embossing roller and a cooled counter roller, thus embossing a "negative" of the diffraction pattern provided on the embossing roller directly onto the metal foil or plate. When this procedure is applied to beverage cans, the embossing procedure is carried out as a final step on the formed can bodies. A wheel is provided with a number of cooled mandrels on which the can bodies are positioned and then, as the wheel rotates, it brings each can body in turn into contact with a heated embossing roller which compresses the sidewall of the can between the surface of the embossing roller and the mandrel. As will be appreciated, this procedure has the disadvantages mentioned above, i.e. that a potentially slow additional step must be carried out on a metal that has been hardened by drawing and ironing. The heating steps soften the metal to some extent, but slows down the overall processing speed. The process as taught relies on careful control of pressure such that it is sufficient to transfer an embossed pattern but not so high as to result in "calendering" of the material (calendering is a term normally associated with paper mills and is the polishing or smoothening of the surface which occurs as a result of sliding of the product against a roll). In the context of the Weitzen et al. invention, it results in the smearing of the embossed surface against the roll and the consequent reduction in quality of the transfer. The patents also teach the careful control of temperature to maintain the metal in a low yield strength condition during the embossing.

There is thus a need for a process of producing an interference pattern on a surface of an article, e.g. a beverage can body, a metal foil, or other article, in a rapid and efficient manner which is consistent with mass production techniques.

DISCLOSURE OF THE INVENTION

An object of the invention is to provide a process of creating a pattern on a surface of an article, e.g. a beverage can, a metal foil, or other article, without necessarily using inks, paints, lacquers, or other non-metallic materials.

Another object of the invention is to produce an optical diffraction grating on a surface of an article in a rapid and efficient manner.

Yet another object of the invention is to provide a process of creating a fabricating tool, such as a die, ironing ring, or embossing roll, suitable for applying a diffraction grating to a surface of an article made, for example, of metal.

Thus, in one form, the invention provides a process of producing an article having a surface provided with an optical diffraction grating such that the surface generates visible colors when illuminated with diffuse white light. The process involves producing the article from a starting material by one or more steps, including a step in which a diffraction relief pattern is impressed on a surface of the article by a tool provided with a bearing surface having a corresponding surface relief pattern of parallel lines that contacts the surface of the article under pressure. During this impressing action, the material is caused to slide in a direction of movement relative to the bearing surface of the tool, and the tool is orientated such that the lines of the relief pattern on the bearing surface of the tool extend parallel to the direction of movement of the article as the diffraction relief pattern is impressed on the surface of the article.

During the impression of the diffraction grating, particularly to a sheet or foil article, the thickness of the article should preferably be reduced by at least 2%, and more preferably by at least 5%, to ensure the required relative movement between the surface of the article and the tool.

The invention also relates to articles, equally beverage cans, provided with color-generating diffraction gratings, produced by the process of the invention. However, the invention may also be used for decorating other types of containers and packages that may benefit from a more attractive appearance, e.g. food cans, aerosols, cosmetics containers, and the like.

The invention makes it possible to apply a diffraction grating to an article during a normal fabrication step, e.g. a rolling step during the production of a foil, or a final shaping step for a shaped article such as a beverage can, without creating delays in, or undue modification of, the manufacturing process. This is possible because the invention makes it possible to impress the pattern on a surface of the article without requiring an additional processing step.

Ironing is one process which can be used for creating the patterns of the invention in harder materials. "Ironing", for articles such as beverage cans, involves pushing a can body mounted on a mandrel through a ring die having a size which causes the metal to be thinned and elongated as it passes through the die. The can surface slides against the die surface as it is being ironed. Marks on the ring die are transferred to the can surface as score marks and are linear and parallel to the direction of sliding.

Another process used in the invention for producing diffraction patterns is extrusion. "Extrusion" resembles ironing in that it involves a change in cross-section of the material as it is passed through a die. However, the material is being forced through the die rather than being pulled by the mandrel and the final surface profile, which need not be circular, is controlled by the die surface. Marks on the bearing surface of the die produce elongated score marks on the surface of the article and are continuous over the length of the extruded article.

Yet another procedure which can be employed in the process of the invention is drawing or tube sinking. These techniques are similar in principle. "Drawing" involves pulling a material through a die rather than pushing it through as in extruding. "Tube sinking" involves pulling a tubular article through a smaller die to reduce the outer and inner diameters of the tube. Once again, both techniques involve moving one surface past another so that marks on the bearing surface create parallel scores or scratches on the article.

Yet another procedure that can be employed in the process of the invention is rolling. In this case, an elongated strip of material is passed between two rolls of a rolling mill, at least one of which has a relief pattern in the form of a circumferentially oriented diffraction grating across all or part of its width. As the strip passes through the roll gap, it is reduced in thickness and caused to elongate in the rolling direction. Within the region of contact, the diffraction grating pattern is impressed into the surface of the strip. As the strip is reduced in thickness and caused to elongate, it is forced to slide forwards relative to the roll surfaces (referred to as "forward slip"). Since the grating lines are parallel to the rolling direction, the relative slip between the sheet and the roll causes the grating pattern to be maintained or even enhanced as the strip exits the roll bite. It will be noted that grating lines in any direction other than substantially parallel to the rolling direction would be degraded or eliminated by the action of the forward slip. This process may be applied to strips or to foils. Foils tend to have a thickness in the range of 5 to 150 microns, and strips tend to have greater thicknesses.

In the present invention, calendering is not a concern, since any sliding of the metal against the roll will be parallel to the embossed pattern and will therefore not cause "smearing" and may even enhance the grating pattern.

It is to be noted that the impression of the diffraction grating in the process of the present invention may be carried out at ambient temperature (without external heating of the article) or at an elevated temperature, as desired. Generally, the diffraction grating may be applied during a typical "cold rolling" operation at temperature in the range of ambient to about 100° C.

BEST MODES FOR CARRYING OUT THE INVENTION

In a first preferred form of the present invention, a diffraction grating consisting of generally straight, parallel ridges and/or grooves (i.e. a relief pattern of straight parallel lines) is applied to a surface of an article as it is being subjected to a final ironing, drawing, tube sinking, extrusion or other similar step. The ridges and/or grooves extend parallel to the direction of travel of the article relative to the finishing tool, e.g. an ironing ring or drawing die, etc.

When the article to be colored is an aluminum beverage can body, the diffraction grating may be created as the can body is passed through the final one of two or three ironing rings used to stretch the sidewalls of an initial drawn cup to the required final size.

Figure 1:
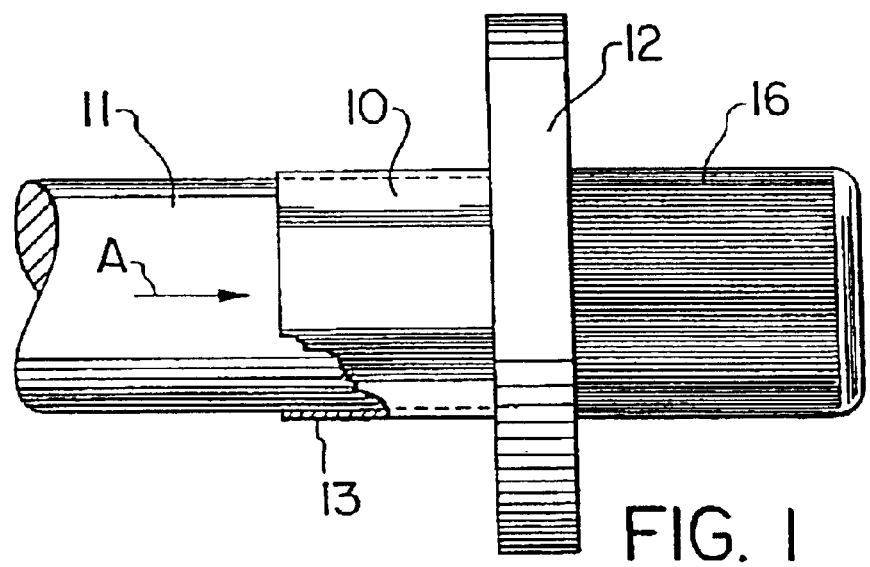
FIG. 1 is a side elevational view showing the final ironing stage in the formation of a beverage can body, and showing part of the can body broken away for clarity.

FIG. 1 shows this step during can body manufacture. The unfinished can body 10 is mounted on a punch 11 (mandrel) of slightly smaller diameter and the punch is used to force the can body through final ironing ring 12, thus elongating and reducing the thickness of the can body wall 13. The direction of travel of the can body through the ring is indicated by arrow A in FIG. 1.

Figure 2:
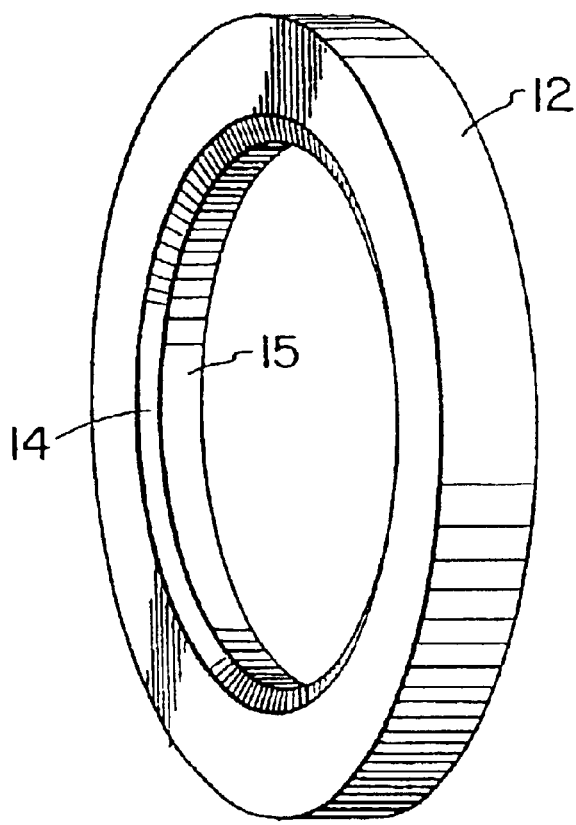
FIG. 2 is an enlarged perspective view of the ironing ring shown in FIG. 1.
Figure 3:
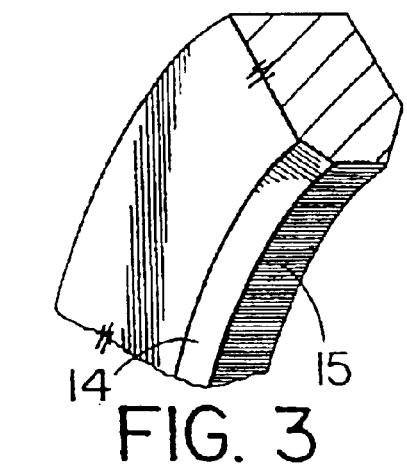
FIG. 3 is a magnified partial view of the inner bearing surface of the ironing ring of FIG. 2.
Figure 4:
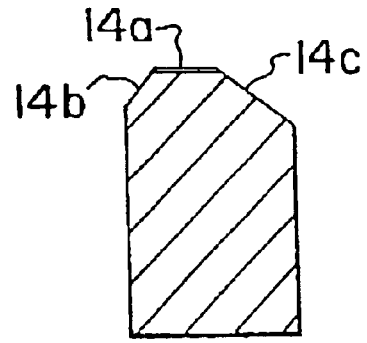
FIG. 4 is a cross-section of the ironing ring of FIG. 2.

The final ironing ring is shown in more detail in FIGS. 2, 3 and 4. The ring 12 has an inner or "bearing" surface 14 which, as can be seen from FIG. 3, has a series of microscopic grooves 15 extending parallel to the longitudinal axis of the ring. The grooves, of which there are about 1000 per mm, form a diffraction grating which is duplicated (in "negative") on the outer surface of the can body 10 as it is forced through the ring.

Advantageously, the grooves arm provided only on a flat central part 14a of the surface 14, the other parts of the surface 14b and 14c being bevelled outwardly as shown in the drawing. This minimizes or prevents "pick-up" of the can material by the ring surface during use, i.e. the transfer of can body material to the bearing surface which can degrade the transferred pattern and cause other problems.

The material used for the ironing ring may be any non-interacting hard tool material conventionally used for ironing. Examples include tungsten carbide-reinforced tool steel, silicon nitride, fibre-reinforced ceramic materials, alumina, nitrided steel, etc., the preferred material being a ceramic such as aluminum nitride or tungsten carbide.

As shown in FIG. 1, the emerging surface of the can body has longitudinal ridges and/or grooves 16, all aligned in the ironing direction A, which form a diffraction grating and result in the generation of a most attractive "vertical rainbow" effect when the can is viewed in the normal upright position and illuminated with diffuse white light.

It is to be noted that, in this embodiment of the invention, the transfer of the diffraction grating to the can body does not involve an embossing process but, rather, the grooves are formed on the can body by a high resolution scoring effect. Since the application pressures are very high (higher than normal embossing pressures), the diffraction pattern is transferred from the bearing surface of the ironing ring to the can surface very efficiently and without the need for heating.

In order to fabricate the diffraction pattern on the application tool itself the grooves can be applied to the bear surface of the ironing ring or other tool by one of a variety of procedures. Suitable methods of transferring holographic or diffractive grating patterns to hard tool materials are well known. For example, U.S. Pat. No. 5,521,030, which issued on May 28, 1996 to Stephen P. McGrew (the disclosure of which is incorporated herein by reference), describes a variety of methods which can be used to generate relief patterns of a diffraction grating into a hard substance. Examples of suitable methods also include the following:

1) Direct machining (ruling) of the bearing surface by a ruling engine similar to those used for engraving diffraction gratings onto flat surfaces;

2) Laser ablation using a high energy laser system capable of generating patterns of surface pits having sizes of about 1 micron;

3) Electron beam ablation using an electron beam system having the capability of generating patterns of pits with dimensions of a few microns (e.g. using techniques as disclosed by Dolves and Hell in an article entitled "Electron Beam Texturing of Rolls", Iron and Steel Engineer, August, 1991, pp. 34–38); or 4) A photoresist/plasma (or chemical) etching process.

The process of the invention provides a way of imparting an attractive appearance to the outer surface of a beverage can or other article. In practice, however, it may be desirable to provide a protective lacquer coating or to add additional logos, messages, designs, etc., by conventional means in order to complete the marking and decoration of the article. However, such conventional techniques, if required at all, need only be applied to small areas of the article surface or may require simpler formulations or thinner coatings, thus significantly reducing the quantity of paint, ink or lacquer used on the can.

While the invention has been explained in connection with the production of beverage can bodies, it may also be used to impart diffraction gratings to the outer surfaces of numerous other articles produced by processes having a final step in which the surface is compressed by a tool moving in relation to the surface, e.g. an ironing ring or drawing or extrusion die. Examples of such articles, which may be of both circular and non-circular transverse cross-sectional profile (e.g. flat,. elliptical, polyhedral, etc.), include drawn wire and extruded trim for electronics equipment and the like.

The above preferred form of the invention relates to the application of diffraction gratings to shaped articles (e.g. beverage cans), but a second preferred form of the invention may be applied to unshaped articles, e.g. articles produced with a bright rolled metal (e.g. aluminum) surface, such as foils, sheets, strips, plates, and the like, of definite or indefinite length.

This second preferred form of the invention may appear to be similar to embossing, but it is different in an important respect. Embossing of aluminum is well known and is used commercially for producing decorative foilware. For such applications, the conventional embossed features are coarse with details down to about 0.5 mm in dimension and with similar depths. In contrast, the process of the second preferred embodiment of the invention can apply diffraction grating patterns with spacing of the order of 1 micron by means of a rolling process. In this case, the pressure applied by the rolls is sufficient to cause plastic deformation of the elongated strip and to cause a reduction in gauge as well as an elongation in the rolling direction. For application of the diffraction grating, the pressure is applied by a specially embossed master roll having the pattern of ridges and/or grooves (the negative relief pattern of the desired diffraction grating) arranged exclusively parallel to the direction of movement (rolling direction) of the article past the master roll. The lines are thus exclusively circumferential of the master roll. The diffraction grating on the master roll may be continuous across the complete width of the roll, or alternatively the polished surface may have been provided with one or more bands of diffraction grating. The resulting sheet would then have corresponding stripes of diffractive surface interspersed with unembossed, reflective sheet surface. The diffraction grating spacing may also be varied across the width in a predetermined way to create variations of the optical effect.

Unlike lines which do not coincide with the rolling direction, grating lines which are parallel to the rolling direction will not be adversely affected by this procedure. Rather than being damaged, the embossed lines produced in this way are not substantially affected by the "forward slip" at the roll exit, and thus retain their essential spacing.

The roll should preferably have a hard, durable surface and, for the case of a thin sheet or foil, the use of a polished backing roll is preferred. The diffraction pattern may be applied to the roll itself in the ways indicated above for the tools of the first preferred form of the present invention.

To minimise wear of the roll surface, the foil or sheet should preferably be of soft or intermediate temper and should preferably have a highly reflective "bright" surface. When the foil or sheet is rolled between the engraved master roll and the backup roll with a load sufficient to transfer the grating pattern to the metal surface, a reduction in thickness will occur and the strip will be elongated in the rolling direction.

Figures 5A, 5B:
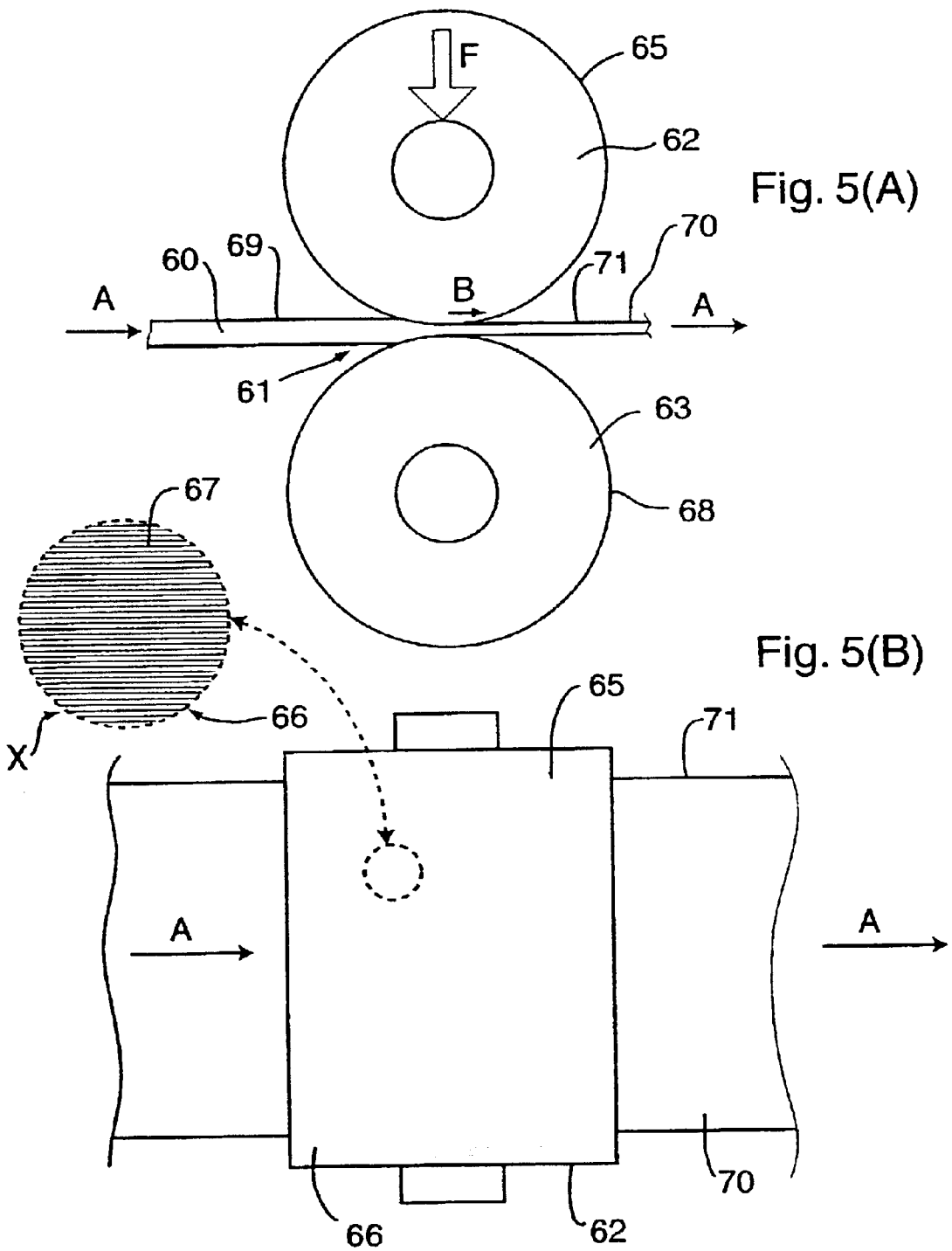
FIGS. 5(A) and 5(B) are, respectively, a side elevation and a top plan view of an example of embossing apparatus useful in one preferred form of the invention for applying a diffusion grating to a surface of a sheet article, e.g. aluminum foil.

An embodiment of this preferred form of the invention is illustrated in FIGS. 5(A) and 5(B) of the accompanying drawings. An aluminum sheet article 60 (e.g. a strip of aluminum foil) of intermediate or soft temper is passed through the nip 61 of an opposed pair of rolls 62, 63 that are loaded with a high force F, that is sufficient to exceed the yield strength of the sheet or foil and to cause a reduction in thickness of the strip by at least 2% and preferably by more than 5%. The uppermost roll 62 is provided with a surface 65 having a pattern 66 of circumferential parallel lines 67 (see the magnified partial region of FIG. 5(B)). The lines have a spacing X from each other that is small enough for the generation of interference patterns when illuminated with diffuse white light. The lower roll 63 is provided with a flat polished surface 68 (although it too could be provided with a diffraction relief pattern, if desired).

As the sheet article 60 is passed through the nip 61 by conventional strip feeding means (not shown), the thickness of the article is slightly reduced (as shown in FIG. 5(A)). This causes "forward slip", indicated by arrow B in FIG. 5(A). The pressure with which the roll 62 contacts the upper surface 69 of the sheet article causes the pattern 66 of lines on the roll 62 to be transferred in negative on the surface 69, forming a desired diffraction pattern 70. The forward slip B does not significantly affect the pattern 70 because the lines of the pattern are parallel with the rolling direction A of the strip article through the apparatus, so the pattern merely becomes slightly elongated without material change to the separation of the lines (which is essential for light diffraction). Once produced in this way, the patterned strip article 71 may be handled in the same way as any other strip article, although steps should preferably be taken to avoid the application of pressure to the patterned surface 69 to avoid damage to the diffraction pattern 70.

Ideally, the pattern transfer pass should preferably not involve the use of lubricant, since this could modify and reduce the quality of the transferred pattern.

The resulting foil or sheet 71 has a visually attractive surface which is of interest for various packaging or other decorative applications. Since the patterned surface is very susceptible to damage by scuffing or abrasion, a protective clear coat lacquer (not shown) may be applied without losing the diffraction effects. Similarly, the surface may be overprinted such that some areas are left exposed. In this way a decorative printed pattern may be enhanced by the diffractive areas which are left to show through.

This form of the invention enables a decorative foil or sheet surface to be produced in an economical way. By requiring the principle diffraction grating lines to be parallel to the rolling direction, it is possible to use a higher impressing load and therefore to get a more efficient pattern transfer than could otherwise be achieved. Thus, the patterning process can take place at relatively high pressures and this extends the range of alloys and temperatures which can be used.

There are many potential uses for diffractive sheet products for decorative purposes. For example, decorative trim for automotive applications, interior decoration panels, packaging materials, premium household foil, labels, gift wraps, etc. Large area diffraction gratings based on these materials also have potential applications for low cost optical element.

It will be apparent to persons skilled in the art that various modifications and alterations to the preferred embodiments mentioned above may be made without departing from the underlying concept of the inventions. All such modifications and alterations are included within the scope of the present invention.

What is claimed is:

1. A process of producing an article having a surface provided with an optical diffraction grating such that said surface generates visible colors when illuminated with diffuse white light, which process comprises providing a starting material, and deforming said starting material to produce said article having said surface, wherein, during said deforming step, a diffraction relief pattern is impressed on said surface of the article by a tool provided with a bearing surface having a corresponding surface relief pattern of parallel lines that contacts the surface of the article under pressure, and while the diffraction relief pattern is being impressed on the surface of the article, the surface is caused to slide in a direction of movement relative to the bearing surface of the tool, and the tool is oriented such that the lines of the relief pattern on the bearing surface of the tool extend parallel to the direction of sliding of the article as the diffraction relief pattern is impressed on the surface of the article.

2. A process according to claim 1, wherein, as the diffraction relief pattern is impressed on the surface of the article, the thickness of the article is reduced by at least 2%.

3. A process according to claim 1, wherein, as the diffraction relief pattern is impressed on the surface of the article, the thickness of the article is reduced by at least 5%.

4. A process according to claim 1, wherein said optical diffraction pattern is impressed by scoring the surface of the article with the surface relief pattern provided on the bearing surface of the tool.

5. A process according to claim 1, wherein the deforming step is carried out by a method selected from the group consisting of ironing, extrusion, drawing and tube sinking.

6. A process according to claim 5, wherein said article, following said method, is elongated and has a constant circular transverse cross-sectional profile.

7. A process according to claim 5, wherein said article is elongated and has a constant non-circular cross-sectional profile.

8. A process according to claim 1, wherein the article is in the form of an elongated strip and the tool is an engraved roll, and wherein the pattern impression is carried out by passing said elongated strip through a nip formed between two rolls, at least one of which is said engraved roll.

9. A process according to claim 1, wherein said starting material is a metal.

10. A process according to claim 9, wherein the metal is aluminum or an aluminum alloy.

11. A process according to claim 1, wherein the article is a beverage can body and the diffraction relief pattern is applied during an ironing step in which a can body precursor supported on a mandrel is forced through an ironing ring acting as said tool.

12. A process according to claim 1, wherein the article is metal foil and the diffraction relief pattern is applied during a rolling step in which a foil precursor strip is rolled to a lesser thickness.

13. A process according to claim 1, wherein the diffraction relief pattern is impressed on the surface of the article without external heating of the article.

14. A process according to claim 1, wherein the diffraction relief pattern is applied to the surface of the article while the article is at a temperature above ambient.

15. A process according to claim 1, wherein the diffraction relief pattern is applied to the surface of the article while the article is held at a temperature in the range of ambient to 100° C.

* * * * *